United States Patent
Czapka et al.

(10) Patent No.: US 11,647,687 B2
(45) Date of Patent: May 16, 2023

(54) SYSTEM AND METHOD FOR CONTROLLING THE DIRECTION OF TRAVEL OF AN AGRICULTURAL IMPLEMENT

(71) Applicant: CNH Industrial America LLC, New Holland, PA (US)

(72) Inventors: Jason T. Czapka, Munster, IN (US); Kevin D. McKee, Naperville, IL (US); Kevin M. Smith, Narvon, PA (US); Robert J. Longua, Palatine, IL (US); Keith W. Wendte, Willowbrook, IL (US); Trevor Stanhope, Darien, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 245 days.

(21) Appl. No.: 17/096,154

(22) Filed: Nov. 12, 2020

(65) Prior Publication Data

US 2021/0059097 A1    Mar. 4, 2021

Related U.S. Application Data

(63) Continuation of application No. 16/057,008, filed on Aug. 7, 2018, now Pat. No. 10,842,068.

(51) Int. Cl.
| | |
|---|---|
| *A01B 63/14* | (2006.01) |
| *A01B 69/04* | (2006.01) |
| *G05D 1/02* | (2020.01) |

(52) U.S. Cl.
CPC ............ *A01B 69/008* (2013.01); *A01B 63/14* (2013.01); *G05D 1/0278* (2013.01);
(Continued)

(58) Field of Classification Search
None
See application file for complete search history.

(56) References Cited

U.S. PATENT DOCUMENTS

| | | | |
|---|---|---|---|
| 8,909,435 B2 | 12/2014 | Tuttle et al. | |
| 2003/0222432 A1* | 12/2003 | Bowers | B60G 21/055 |
| | | | 280/677 |

(Continued)

FOREIGN PATENT DOCUMENTS

| | | |
|---|---|---|
| EP | 2572907 B1 | 3/2015 |
| EP | 2679470 B1 | 5/2015 |

OTHER PUBLICATIONS

Case IH Agriculture, The Heart of the Farming Beats Red, PUMA 150-240 Tractors, May 2016, 36 Pages. https://d3ulquarki94vp.cloudfront.net/casieh/ANZ/ANZASSETS/Brochures/TractorsPuma_CVT_15C0001_NZ.PDF.

(Continued)

*Primary Examiner* — James M McPherson
(74) *Attorney, Agent, or Firm* — Rebecca Henkel; Rickard DeMille (57) ABSTRACT

In one aspect, a system for controlling the direction of travel of agricultural implements may include a work vehicle having a vehicle-based controller configured to control an operation of a valve provided in operative association with the work vehicle. The system may also include an agricultural implement configured to be towed by the work vehicle. The implement may include a sensor configured to detect an operational parameter indicative of a direction of travel of the implement. The implement may also include an actuator configured to adjust the direction of travel of the implement, with the actuator being fluidly coupled to the valve such that the valve is configured to control an operation of the actuator. The implement may further include an implement-based controller configured to initiate control of the operation of the valve based on sensor data received from the sensor to adjust the direction of travel of the implement.

20 Claims, 5 Drawing Sheets

(52) U.S. Cl.
CPC ......... *G05D 1/0246* (2013.01); *G05D 1/0255* (2013.01); *G05D 1/0257* (2013.01); *G05D 2201/0201* (2013.01)

(56) References Cited

U.S. PATENT DOCUMENTS

| | | | | |
|---|---|---|---|---|
| 2011/0315234 A1* | 12/2011 | Diaz | ...................... | A01B 63/22 |
| | | | | 137/511 |
| 2015/0245556 A1* | 9/2015 | Prickel | ................... | A01C 7/208 |
| | | | | 701/50 |
| 2015/0366126 A1* | 12/2015 | Buelow | ................ | A01B 79/005 |
| | | | | 111/170 |
| 2015/0373905 A1* | 12/2015 | Anderson | ............... | A01C 21/00 |
| | | | | 701/33.9 |
| 2016/0095274 A1* | 4/2016 | Wendte | ................ | A01B 79/005 |
| | | | | 111/200 |
| 2016/0316621 A1 | 11/2016 | Fritz et al. | | |
| 2017/0083026 A1 | 3/2017 | Schmidt et al. | | |
| 2018/0206387 A1 | 7/2018 | Stark | | |
| 2018/0239360 A1* | 8/2018 | Valberg | ................ | G06F 3/0488 |
| 2019/0258271 A1 | 8/2019 | Sporrer | | |

OTHER PUBLICATIONS

Ehrl, Steer-byWire via Isobus, Landtechnik, Process Control 62 SH2006, pp. 286-287.

\* cited by examiner

SYSTEM AND METHOD FOR CONTROLLING THE DIRECTION OF TRAVEL OF AN AGRICULTURAL IMPLEMENT

CROSS-REFERENCE TO RELATED APPLICATIONS

This application is a continuation of and claims the benefit of priority of U.S. patent application Ser. No. 16/057,008, filed on Aug. 7, 2018, the disclosure of which is hereby incorporated by reference herein in its entirety for all purposes.

FIELD

The present disclosure generally relates to agricultural implements and, more particularly, to systems and methods for controlling the direction of travel of an agricultural implement being towed by a work vehicle.

BACKGROUND

Agricultural implements, such as planters, cultivators, pull-type sprayers, nutrient applicators, and/or the like, are configured to be towed across a field by a suitable work vehicle, such as an agricultural tractor. While traversing the field, the implement is configured to perform one or more operations on the field, such as planting seeds, cultivating the soil, and/or applying pesticides, nutrients, and/or other agricultural substances. In many instances, to maintain the desired precision of the operation(s) being performed by the implement, it is necessary that the implement have a generally constant orientation or position relative to the work vehicle.

Accordingly, an improved system and method for controlling the direction of travel of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling the direction of travel of agricultural implements. The system may include a work vehicle including a vehicle-based controller, with the vehicle-based controller being configured to control an operation of a valve provided in operative association with the work vehicle. The system may also include an agricultural implement configured to be towed by the work vehicle. The implement may include a sensor configured to detect an operational parameter indicative of a direction of travel of the implement. The implement may also include an actuator configured to adjust the direction of travel of the implement, with the actuator being fluidly coupled to the valve such that the valve is configured to control an operation of the actuator. The implement may further include an implement-based controller supported on the implement and being communicatively coupled to the sensor. The implement-based controller may be configured to initiate control of the operation of the valve based on sensor data received from the sensor to adjust the direction of travel of the implement.

In another aspect, the present subject matter is directed to a method for controlling the direction of travel of agricultural implements. The method may include monitoring, with an implement-based computing device installed on the implement, an operational parameter indicative of a direction of travel of an agricultural implement as the implement is being towed across a field by a work vehicle. The work vehicle may include a vehicle-based computing device configured to control an operation of a valve provided in operative association with the work vehicle. The method may also include comparing, with the implement-based computing device, the monitored operational parameter to at least one threshold parameter value. Furthermore, when the monitored operational parameter exceeds or falls below the least one threshold parameter value, the method may include initiating, with the implement-based computing device, control of the operation of the valve to actuate an actuator of the implement in a manner that adjusts a direction of travel of the implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the direction of travel of an agricultural implement being towed by a work vehicle across a field. In several embodiments, the work vehicle may include a vehicle-based controller(s) configured to control the operation of a valve(s) provided in operative association with the vehicle. Furthermore, the implement may include a sensor(s) coupled thereto that is configured to detect an operational parameter indicative of the direction of travel of the implement. Moreover, the implement may also include an actuator configured to adjust the direction of travel of the implement, with the actuator being fluidly coupled to the valve(s) on the work vehicle such that the valve is configured to control the operation of the actuator. In this regard, an implement-based controller(s) supported on the implement may be configured to initiate control of the operation of valve of the work vehicle based on data received from the sensor to allow the direction of travel of the implement to be adjusted. For instance, upon receipt of the data from the sensor, the implement-based controller may be configured to transmit signals to the vehicle-based controller(s) (e.g., via ISOBUS Class 3 communications protocols (ISO 11783-9)) requesting the vehicle-based controller(s) to control the operation of the valve in a manner that adjusts or varies the direction of travel of the implement. As such, based on the request from the implement-based controller(s), the vehicle-based controller(s) may control the valve(s) such that the actuator adjusts or varies the direction of travel of the implement.

Figure 1:
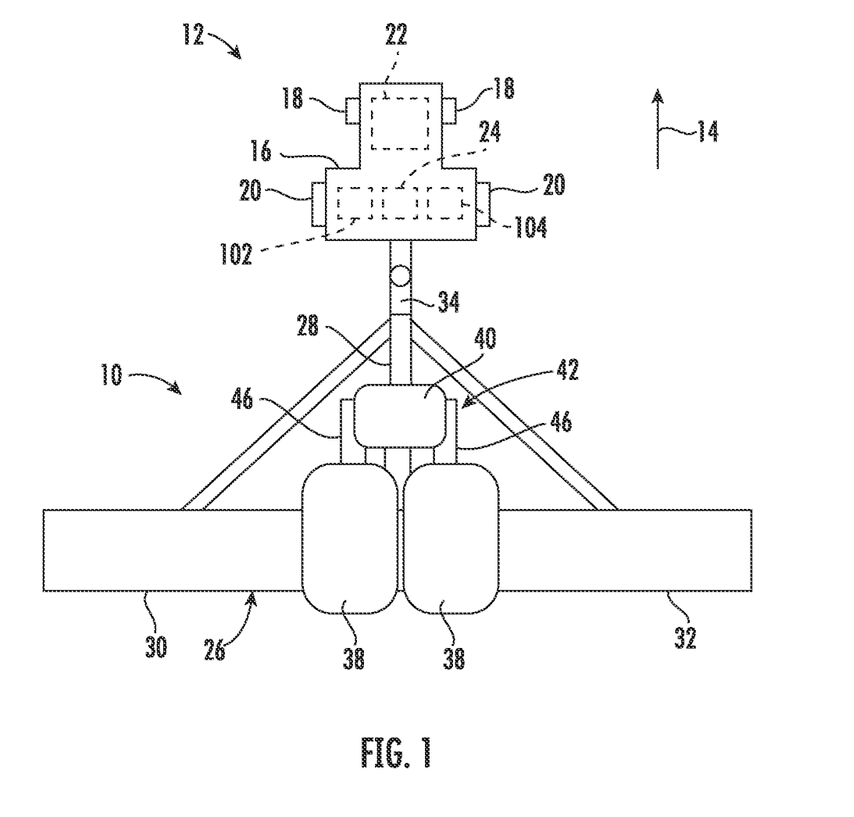
FIG. 1 illustrates a top view of one embodiment of an agricultural implement coupled to a work vehicle in accordance with aspects of the present subject matter.
Figure 2:
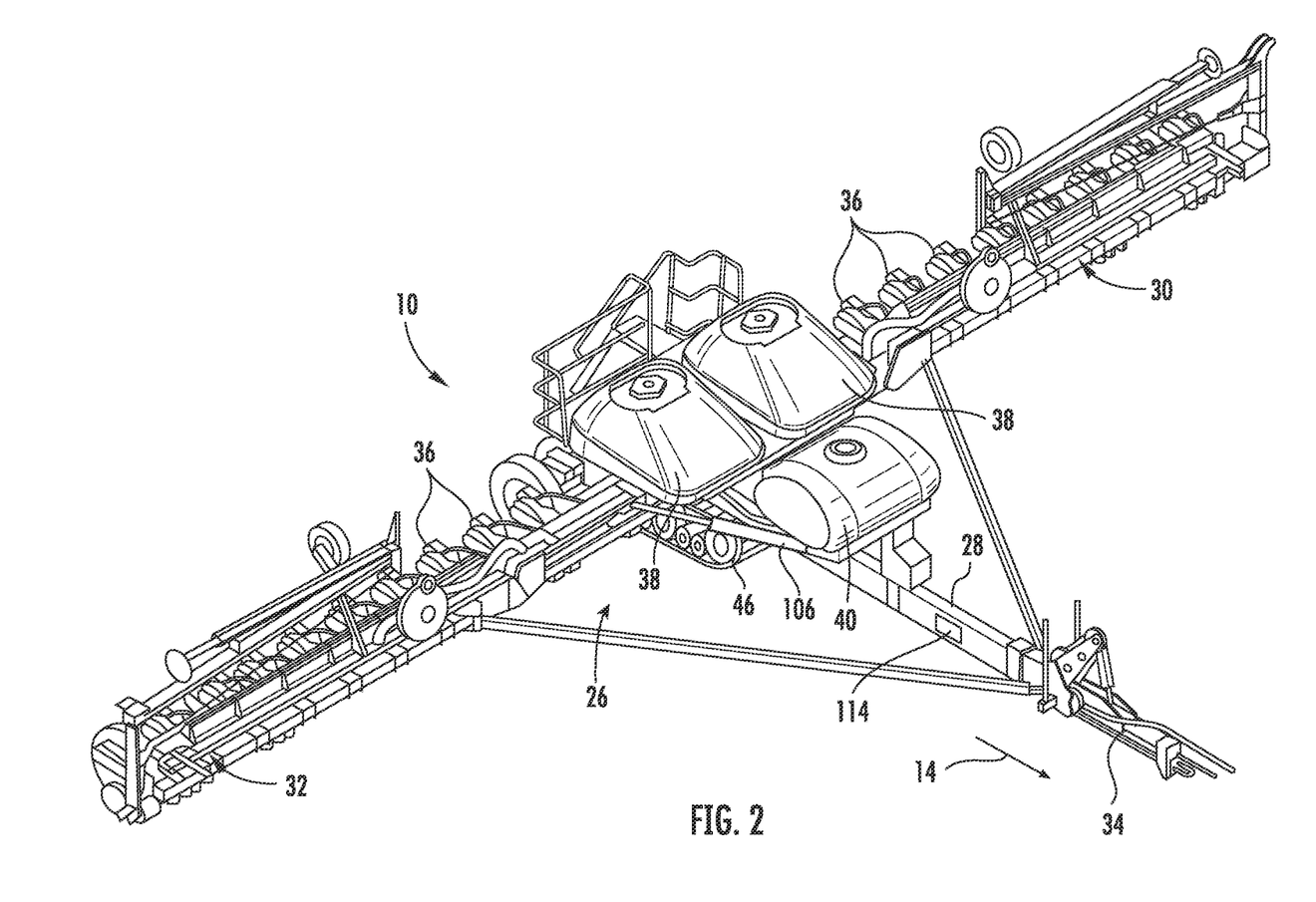
FIG. 2 illustrates a perspective view of the agricultural implement shown in FIG. 1, particularly illustrating various components of the implement.

Referring now to the drawings, FIGS. 1 and 2 illustrate differing views of one embodiment of an agricultural implement 10 in accordance with aspects of the present subject matter. Specifically, FIG. 1 illustrates atop view of the agricultural implement 10 coupled to a work vehicle 12. Additionally, FIG. 2 illustrates a perspective view of the implement 10, particularly illustrating various components of the implement 10.

In general, the work vehicle 12 may be configured to tow the implement 10 across a field in a direction of travel (e.g., as indicated by arrow 14 in FIG. 1). In several embodiments, the direction of travel 14 of the implement 10 may be the direction of travel of a steerable component (e.g., a track assembly 42) of the implement 10. As shown, the work vehicle 12 may be configured as an agricultural tractor and the implement 10 may be configured as an associated planter. However, in other embodiments, the work vehicle 12 may be configured as any other suitable type of vehicle, such as an agricultural harvester, a self-propelled sprayer, and/or the like. Similarly, the implement 10 may be configured as any other suitable type of implement, such as a tillage implement.

As shown in FIG. 1, the work vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the work vehicle 12 relative to the ground and move the work vehicle 12 in the direction of travel across the field. In this regard, the work vehicle 12 may include an engine 22 and a transmission 24 mounted on the frame 16. The transmission 24 may be operably coupled to the engine 22 and may provide variably adjusted gear ratios for transferring engine power to the driven wheels 20. However, it should be appreciated that, in alternative embodiments, the front and rear wheels 18, 20 may be driven. Additionally, it should be appreciated that, in further embodiments, the work vehicle 12 may include a track assembly(ies) (not shown) in place of the front and/or rear wheels 18, 20. Furthermore, it should be appreciated that, in a further embodiment, the frame 16 may be articulated in addition to or in lieu of the steerable wheels 18.

Moreover, one or more sensors 102, 104 may be provided in operative association with the work vehicle 12. Specifically, in several embodiments, the work vehicle 12 may include a speed sensor 102 configured to detect a parameter associated with the speed at which the work vehicle 12 is moved across the field. For instance, in one embodiment, the speed sensor 102 may be configured as a Hall Effect sensor configured to detect the rotational speed of an output shaft of the transmission 24 of the work vehicle 12. Furthermore, the work vehicle 12 may include a location sensor 104 configured to detect a parameter associated with a geographical or physical location of the work vehicle 12 within the field. For instance, in one embodiment, the location sensor 104 may correspond to a GPS receiver configured to detect the GPS coordinates of the work vehicle 12. However, it should be appreciated that, in alternative embodiments, the speed sensor 102 may be configured as any suitable device for sensing or detecting the speed of the work vehicle 12 and/or the location sensor 104 may be configured as any suitable location sensing device for detecting the location of the work vehicle 12. Furthermore, it should be appreciated that the work vehicle 12 may include other sensors in addition to or in lieu of the speed sensor 102 and/or the location sensor 104.

Referring to FIGS. 1 and 2, the implement 10 may include a frame 26 configured to support and/or couple to one or more components of the implement 10. Specifically, in several embodiments, the frame 26 may include a center section 28 and a pair of wings sections 30, 32. In one embodiment, the wings sections 30, 32 may be pivotably coupled to center section 28 in a manner that permits the wing sections 30, 32 to fold forward to reduce the lateral width of the implement 10, such as during storage or transportation of the implement 10 on a road. In such embodiment, the implement 10 may include a pair of actuators 106 (only one actuator 106 is shown in FIG. 2), with each actuator 106 being coupled between one of the wings sections 30, 32 in the center section 28. Furthermore, a tow bar 34 may be coupled to the center section 28 to allow the implement 10 to be towed by the work vehicle 12. Moreover, a track assembly 42 may be coupled to the center section 28 to support at least a portion of the frame 26 relative to the ground. As shown in FIG. 2, the wing sections 30, 32 may generally be configured to support a plurality of seed planting units (or row units) 36. As is generally understood, each row unit 36 may be configured to deposit seeds at a desired depth beneath the soil surface and at a desired seed spacing as the implement 10 is being towed by the work vehicle 12, thereby establishing rows of planted seeds. In some embodiments, the bulk of the seeds to be planted may be stored in one or more hoppers or seed tanks 38 mounted on or otherwise supported by the frame 26. Thus, as seeds are planted by the row units 36, a pneumatic distribution system (not shown) may distribute additional seeds from the seed tanks 38 to the individual row units 36. Additionally, one or more fluid tanks 40 mounted on or otherwise supported by the frame 26 may store agricultural fluids, such as insecticides, herbicides, fungicides, fertilizers, and/or the like, which may be applied during operation of the implement 10.

It should be appreciated that, for purposes of illustration, only a portion of the row units 36 of the implement 10 have been shown in FIG. 2. In general, the implement 10 may include any number of row units 36, such as 6, 8, 12, 16, 24, 32, or 36 row units. In addition, it should be appreciated that the lateral spacing between row units 36 may be selected based on the type of crop being planted. For example, the row units 36 may be spaced approximately 30 inches from one another for planting corn, and approximately 15 inches from one another for planting soybeans.

In accordance with aspects of the present disclosure, the implement 10 may include one or more sensors 114 configured to detect an operational parameter indicative of the direction of travel 14 of the implement 10. Specifically, in one embodiment, the operational parameter detected by the sensor(s) 114 may be the location of the implement 10 within the field. For example, in such embodiment, the sensor(s) 114 may include a location sensor, such as a GPS receiver, configured to detect the GPS coordinates of the implement 10. In another embodiment, the operational parameter detected by the sensor(s) 114 may be indicative of the orientation of the implement 10 relative to the vehicle 12. For example, in such embodiment, the sensor(s) 114 may include an orientation sensor, such as a potentiometric sensor or a strain gauge, configured to detect an angle defined between the implement 10 and the work vehicle 12. In further embodiments, the sensor(s) 114 may be configured to detect seedbed ridges, furrows, and/or any other suitable geographical or crop feature feature(s) present within the field. In such embodiments, the sensor(s) may include a non-contact based sensor, such as a LIDAR sensor, a RADAR sensor, an ultrasonic sensor, an image capture device (e.g., an RGB, NIR-RGB, or CIR camera), and/or the like. Alternatively, in such embodiments, the sensor(s) 114 may include a suitable contact based sensor, such as potentiometric sensor, a load sensor, a torque sensor, or a strain gauge. However, it should be appreciated that, in alternative embodiments, the sensor(s) 114 may include any other suitable type of sensor(s) and/or the sensor(s) 114 may be configured to detect any other suitable operational parameter(s) of the implement 10. Furthermore, although the sensor(s) 114 is schematically illustrated as being positioned on the center section 28 of the frame 26 in FIG. 2, it should be appreciated that the sensor(s) 114 may be positioned in any other suitable location on the implement 10.

Figure 3:
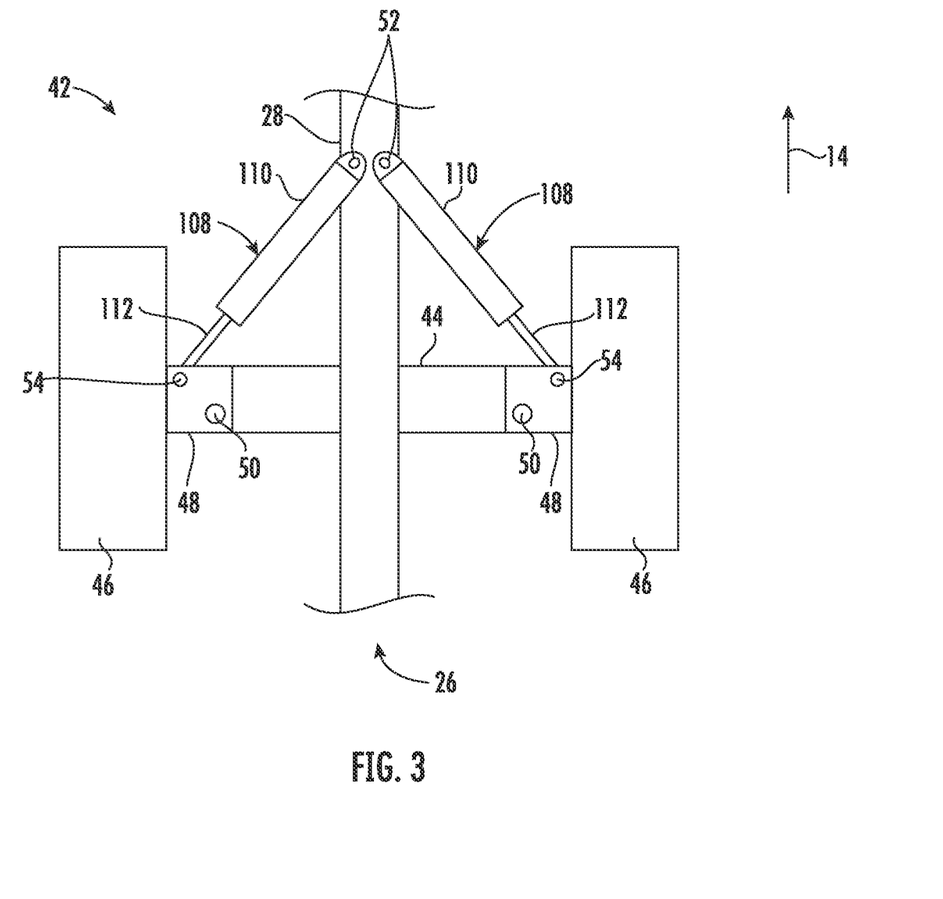
FIG. 3 illustrates a top view of one embodiment of a track assembly of an agricultural implement in accordance with aspects of the present subject matter.

Referring now to FIG. 3, one embodiment of a track assembly 42 suitable for use with the implement 10 shown in FIGS. 1 and 2 is illustrated in accordance with aspects of the present subject matter. In several embodiments, the track assembly 42 may include an axle 44 coupled to the center section 28 of the frame 26. The track assembly 42 may also include a pair of tracks 46 that are pivotably coupled to the axle 44. For example, in one embodiment, each of the tracks 46 may be coupled to a corresponding knuckle 48, with each knuckle 48 being pivotably coupled to the axle 44 at a pivot joint 50. As such, the pivot joints 50 may permit the tracks 46 to pivot or otherwise move relative to the axle 44 in a manner that adjusts the direction of travel 14 of the implement 10 (e.g., the direction of travel or orientation of the tracks 46). However, it should be appreciated that, in alternative embodiments, the tracks 46 of the track assembly 42 may be movably coupled to the frame 26 in any other suitable manner that permits the direction of travel 14 of the implement 10 to be adjusted. Furthermore, it should be appreciated that the implement 10 may include other components configured to adjust the direction of travel 14. For example, the implement 10 may include one or more steerable wheels or coulters (not shown) that are configured to adjust the direction of travel 14 of the implement 10.

Moreover, the track assembly 42 may include a pair of actuators 108 configured to move the tracks 46 relative to the implement frame 26. As shown, in several embodiments, a cylinder 110 of each actuator 108 may be pivotably coupled to the center section 28 at pivot joints 52, while a rod 112 of each actuator 108 may be pivotably coupled to one of the knuckles 48 at a pivot joint 54. As will be described below, the rods 112 of the actuators 108 may be configured to extend and/or retract relative to the cylinder 110 of the associated actuator 108 to move the tracks 46 relative to the center section 28 of the frame 26, which, in turn, adjusts the direction of travel 14 of the implement 10. In the illustrated embodiment, the actuators 108 correspond to fluid-driven actuators, such as hydraulic or pneumatic cylinders. However, it should be appreciated that the actuators 108 may correspond to any other suitable type of actuator, such as electric linear actuators. Furthermore, it should be appreciated that the implement 10 may include any other suitable number of actuators configured to adjust the position of the tracks 46 relative to the frame 26, such as a single actuator or three or more actuators.

Moreover, it should be appreciated that the configuration of the implement 10, the work vehicle 12, and the track assembly 42 described above and shown in FIGS. 1-3 is provided only to place the present subject matter in an exemplary field of use. Thus, it should be appreciated that the present subject matter may be readily adaptable to any manner of implement, work vehicle, and/or hitch assembly configurations.

Figure 4:
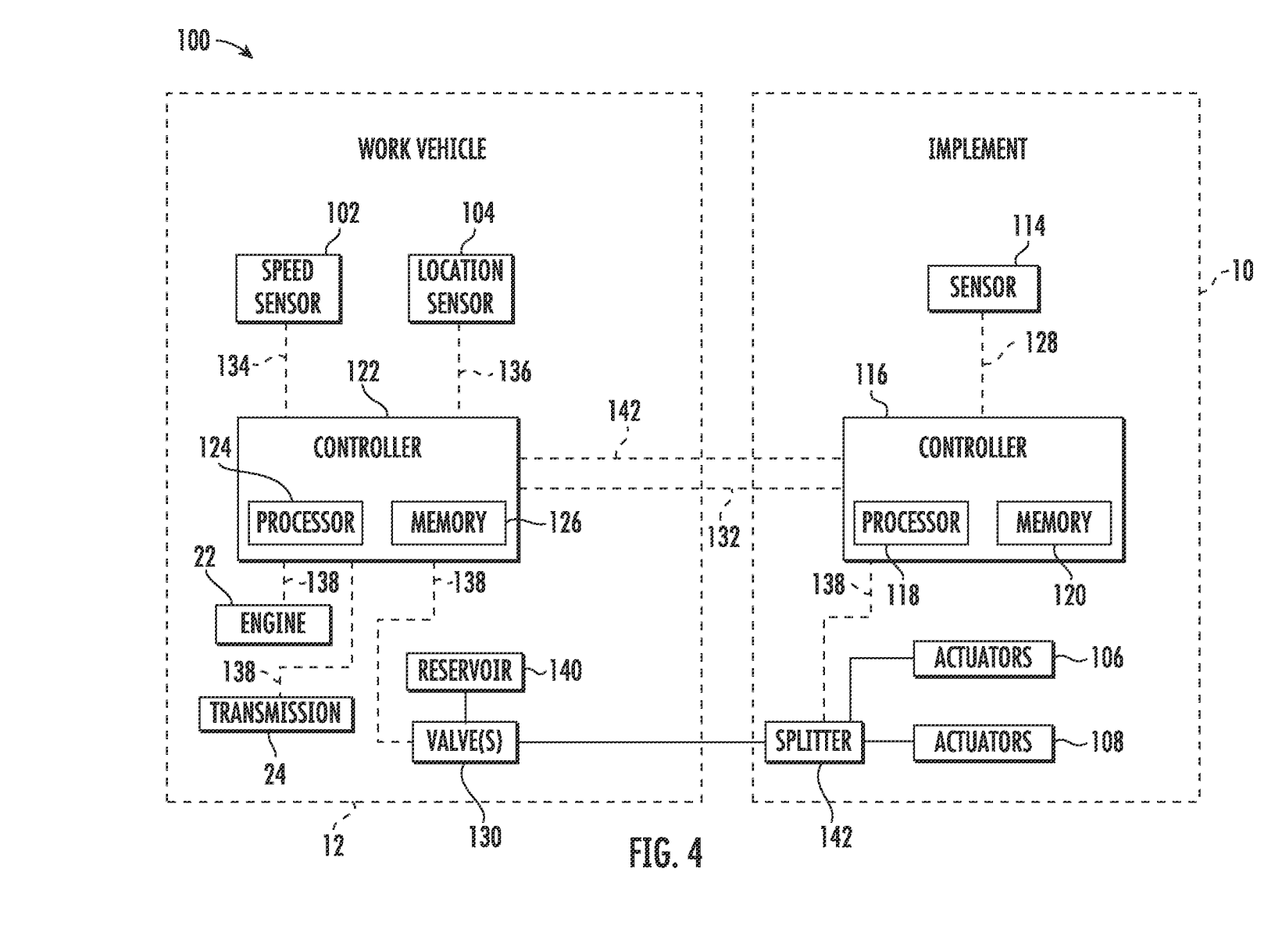
FIG. 4 illustrates a schematic view of one embodiment of a system for controlling the direction of travel of an agricultural implement in accordance with aspects of the present subject matter.

Referring now to FIG. 4, a schematic view of one embodiment of a system 100 for controlling the direction of travel of an agricultural implement being towed by a work vehicle is illustrated in accordance with aspects of the present subject matter. In general, the system 100 will be described herein with reference to the implement 10, the work vehicle 12, and the track assembly 42 described above with reference to FIGS. 1-3. However, it should be appreciated by those of ordinary skill in the art that the disclosed system 100 may generally be utilized with implements having any other suitable implement configuration, work vehicles having any other suitable work vehicle configuration, and/or track assemblies having any other suitable assembly configuration.

As shown in FIG. 4, the system 100 may include one or more implement-based controllers 116 positioned on and/or within or otherwise associated with the implement 10. In general, the implement controller(s) 116 may comprise any suitable processor-based device known in the art, such as a computing device or any suitable combination of computing devices. Thus, in several embodiments, the controller(s) 116 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 120 of the controller(s) 116 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 120 may generally be configured to store suitable computer-readable instructions that, when implemented by the processor(s) 118, configure the implement controller(s) 116 to perform various computer-implemented functions, such as one or more aspects of the method 200 described below with reference to FIG. 5. In addition, the implement controller(s) 116 may also include various other suitable components, such as a communications circuit or module, one or more input/output channels, a data/control bus and/or the like.

It should be appreciated that the implement controller(s) 116 may correspond to an existing controller(s) of the implement 10, itself, or the controller(s) 116 may correspond to a separate processing device(s). For instance, in one embodiment, the implement controller(s) 116 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller(s) 116 may be performed by a single processor-based device or may be distributed across any number of processor-based devices, in which instance such devices may be considered to form part of the implement controller(s) 116.

Moreover, the system 100 may include one or more work vehicle-based controllers 122 positioned on and/or within or otherwise associated with the work vehicle 12. In general, the vehicle controller(s) 122 may comprise any suitable processor-based device known in the art, such as a computing device or any suitable combination of computing devices. Thus, in several embodiments, the controller(s) 122 may include one or more processor(s) 124 and associated memory device(s) 126 configured to perform a variety of computer-implemented functions. Such memory device(s) 126 may generally be configured to store suitable computer-readable instructions that, when implemented by the processor(s) 124, configure the vehicle controller(s) 122 to perform various computer-implemented functions, such as one or more aspects of the method 200 described below with reference to FIG. 5. In addition, the vehicle controller(s) 122 may also include various other suitable components, such as a communications circuit or module, one or more input/ output channels, a data/control bus and/or the like.

It should be appreciated that the vehicle controller(s) 122 may correspond to an existing controller(s) of the work vehicle 12, itself, or the controller(s) 122 may correspond to a separate processing device. For instance, in one embodiment, the vehicle controller(s) 122 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller(s) 122 may be performed by a single processor-based device or may be distributed across any number of processor-based devices, in which instance such devices may be considered to form part of the vehicle controller(s) 122. For instance, the functions of the vehicle controller(s) 122 may be distributed across multiple application-specific controllers, such as an electro-hydraulic remote (EHR) valve controller, a navigation controller, and/or the like.

In several embodiments, the implement controller(s) 116 may be configured to monitor an operational parameter(s) associated with the direction of travel 14 of the implement 10 based on sensor data received from the implement-based sensor(s) 114. Specifically, the implement controller(s) 116 may be communicatively coupled to the sensor(s) 114 via a wired or wireless connection to allow sensor data (e.g., indicated by dashed lines 128 in FIG. 4) to be transmitted from the sensor(s) 114 to the controller(s) 116. The implement controller(s) 116 may then be configured determine or estimate the operational parameter based on the sensor data 128 received from the sensor(s) 114. For instance, the implement controller(s) 116 may include a look-up table, suitable mathematical formula, and/or algorithms stored within its memory 120 that correlates the sensor data 128 to the operational parameter.

As indicated above, the operational parameter monitored by the implement controller(s) 116 may be indicative of the direction of travel 14 of the implement 10, such as the location of the implement 10 within the field or the orientation of the implement 10 relative to the work vehicle 12 or features within the field (e.g., seedbed ridges). For example, in one embodiment, the parameter may be an angle defined between the orientation of the implement 10 and an orientation of the vehicle 12 or the orientation of the implement 10 and an orientation of the crop rows within the field.

Furthermore, in one embodiment, the implement controller(s) 116 may be configured to compare the monitored operational parameter to one or more desired operational parameter ranges. For instance, the implement controller(s) 116 may be configured to compare the values associated with the monitored parameter to a predetermined operational parameter range defined for the implement 10. Thereafter, in the event that the monitored operational parameter exceeds a maximum operational parameter threshold for the given operational parameter range or falls below a minimum operational parameter threshold for such range (thereby indicating that the operational parameter of the implement 10 may be too high or too low), the implement controller(s) 116 may be configured to initiate control of the operation of a valve(s) 130 provided in operative association with the work vehicle 12. As will be described below, the valve(s) 130 may be configured to control the operation of the actuators 108 on the implement 10 in a manner that adjusts the direction of travel 14 of the implement 10.

As indicated above, in several embodiments, the operational parameter may be indicative of the orientation of the implement 10 relative to the vehicle 12 or the feature(s) (e.g., seedbed ridges) within the field, such as an angle defined between the direction of travel 14 of the implement 10 and a direction of travel of the vehicle 12 or between the direction of travel 14 of the implement 10 and an orientation of the seedbed ridges. In such embodiments, the implement controller(s) 116 may be configured to compare the monitored direction of travel 14 of the implement 10 to a target direction of travel of the implement 10 in order to determine a differential defined therebetween. Thereafter, in the event that the determined travel direction differential exceeds an associated predetermined differential threshold (thereby indicating that the difference between the monitored direction of travel and the target direction of travel may be too great), the implement controller(s) 116 may be configured to initiate control of the operation of the valve(s) 130 on the work vehicle 12 to adjust or regulate the direction of travel 14 of the implement 10.

In several embodiments, the one or more implement controllers 116 may be configured to request the vehicle controller(s) 122 to control the operation of the valve(s) 130 on the work vehicle 12. Specifically, as shown in FIG. 4, the implement controller(s) 116 may be communicatively coupled to the one or more vehicle controller(s) 122 via a wired or wireless connection to allow request signals (e.g., indicated by dashed lines 132 in FIG. 4) to be transmitted from the implement controller(s) 116 to the vehicle controller(s) 122. For example, in one embodiment, the request signals 132 may be transmitted from the implement controller(s) 116 to the vehicle controller(s) 122 via ISOBUS Class 3 (ISO 11783-9) communications protocols. However, in alternative embodiments, the request signals 132 may be transmitted via suitable CAN bus communications protocols or any other suitable communications protocols. Upon receipt of the request signals 132, the vehicle controller(s) 122 may be configured to determine whether to control the operation of the valve(s) 130 in the manner requested by the implement controller(s) 116.

In one embodiment, the vehicle controller(s) 122 may be configured to determine when to control the valve(s) 130 in the manner requested by the implement controller(s) 116 based on the speed of the vehicle 12. Specifically, the vehicle controller(s) 122 may be communicatively coupled to the speed sensor 102, via wired or wireless connection to allow measurement signals (e.g., as indicated by dashed line 134 in FIG. 4) to be transmitted from the speed sensor 102 to the vehicle controller(s) 122. As such, the vehicle controller(s) 122 may be configured to determine or estimate the current speed at which the vehicle 12 is moving across the field. For instance, the vehicle controller(s) 122 may include a look-up table or suitable mathematical formula stored within its memory 126 that correlates the sensor measurements to the current speed of the vehicle 12. Thereafter, the vehicle controller(s) 122 may be configured to compare the determined speed of the vehicle 12 to a predetermined minimum vehicle speed threshold. When the determined speed of the vehicle 12 exceeds the predetermined minimum vehicle speed threshold, the vehicle controller(s) 122 may be configured to control the valve(s) 130 in the manner requested by the implement controller(s) 116. Conversely, when the determined speed of the vehicle 12 falls below the predetermined minimum vehicle speed threshold, the vehicle controller(s) 122 may be configured to ignore the request signals 132 received from the implement controller(s) 116.

In another embodiment, the vehicle controller(s) 122 may be configured to determine when to control the valve(s) 130 in the manner requested by the implement controller(s) 116 based on the location of the vehicle 12 within the field. Specifically, the vehicle controller(s) 122 may be communicatively coupled to the location sensor 104, via wired or wireless connection to allow location signals (e.g., as indicated by dashed line 136 in FIG. 4) to be transmitted from the location sensor 104 to the vehicle controller(s) 122. As such, the vehicle controller(s) 122 may be configured to determine or estimate the current location of the vehicle 12 within the field. For example, the vehicle controller(s) 122 may be configured to compare this determined location to a map stored within its memory 126 to determine the location of the vehicle 12 within the field. Based on the location of the work vehicle 12 within the field, the vehicle controller(s) 122 may be configured to determine when the performance of field operations by the implement 10 has ceased, such as when the vehicle 12 is positioned proximate to and/or within a headland or area of boundary or swath overlap. In such instances, the vehicle controller(s) 122 may be configured to ignore the request signals 132 received from the implement controller(s) 116.

As indicated above, the vehicle controller(s) 122 may be configured to control the operation of the valve(s) 130 to adjust the direction of travel 14 of the implement 10. For instance, in the illustrated embodiment, the vehicle controller(s) 122 is communicatively coupled to the valves(s) 130 to allow control signals (e.g., indicated by dashed lines 138 in FIG. 4) to be transmitted from the vehicle controller(s) 122 to the valves(s) 130. In this regard, the vehicle controller(s) 122 may be configured to control the operation of the valves(s) 130 in a manner that regulates the flow state, flow rate, and/or pressure of the hydraulic fluid supplied to the actuators 108 on the implement 10 from a reservoir 140 of the work vehicle 12. In such an embodiment, the flow state, flow rate, and/or pressure of the fluid supplied from the valves(s) 130 may be associated with the amount of extension/retraction of the actuators 108, thereby allowing the vehicle controller(s) 122 to control the displacement of the actuators 108. In one embodiment, the valves(s) 130 may correspond to or be incorporated into an electro-hydraulic remote (EHR) valve block.

Furthermore, in one embodiment, the valves(s) 130 may be provided in fluid communication with other actuators (e.g., the actuators 106) on the implement 10. In such embodiment, the system 100 may include a flow splitter 142 (e.g., a suitable solenoid valve or other two-way valve) configured to selectively direct the flow of hydraulic fluid provided by the valves(s) 130 to either the actuators 108 or the other actuators on the implement 10. For example, in the illustrated embodiment, the flow splitter 142 is positioned on the implement 10 and communicatively coupled to the implement controller(s) 116 to allow control signals 138 (e.g., as indicated by dashed line 138 in FIG. 4) to be transmitted from the implement controller(s) 116 to the flow splitter 142. Furthermore, the flow splitter 142 may be provided in fluid communication with the valves(s) 130, the actuators 106, and the actuators 108. As such, the flow splitter 142 may be configured to selectively divert the flow of hydraulic fluid provided by the valves(s) 130 between the actuators 108 and the actuators 106. In one embodiment, the implement controller(s) 116 may be configured to control the operation of the flow splitter 142 such that the flow of hydraulic fluid provided by the valve(s) 130 is diverted to the actuators 108 when the monitored speed of the work vehicle 12 exceeds the predetermined minimum vehicle speed threshold. Additionally, the implement controller(s) 116 may be configured to control the operation of the flow splitter 142 such that the flow of hydraulic fluid provided to the valve(s) 130 is diverted to the actuators 108 when it is determined that the performance of a field operations by the implement 10 has ceased (e.g., the work vehicle 12 and the implement 10 are positioned within a headland). In such instances, the flow of hydraulic fluid provided by the valves(s) 130 may be used to adjust the direction of travel 14 of the implement 10. Conversely, the implement controller(s) 116 may be configured to control the operation of the flow splitter 142 such that the flow of hydraulic fluid provided by the valves(s) 130 is diverted to the actuators 106 when the monitored speed of the work vehicle 12 falls below the predetermined minimum vehicle speed threshold and/or it is determined that the implement 10 is currently performing field operations (e.g., the work vehicle 12 and the implement are positioned within a region of the field in which field operations, such as seeding, are performed). In such instances, the flow of hydraulic fluid provided by the valves(s) 130 may be used to fold the wing sections 30, 32 of the implement frame 26 forward. However, it should be appreciated that, in alternative embodiments, the flow splitter 142 may be configured to divert the flow of hydraulic fluid provided by the valves(s) 130 between the actuators 108 in any other suitable actuators on the implement 10 and/or the work vehicle 12. Furthermore, it should be appreciated that, in further embodiments, the flow splitter 142 may be positioned on the work vehicle 12 and communicatively coupled to the vehicle controller(s) 122. Additionally, it should be appreciated that, in additional embodiments, the system 100 may not include the flow splitter 142. In such embodiments, the flow of hydraulic fluid provided by the valves(s) 130 flows directly to the actuators 108.

Additionally, in one embodiment, the vehicle controller(s) 122 may be configured to automatically adjust the speed at which the work vehicle 12 is towing the implement 10 across the field when the monitored operational parameter falls outside of the predetermined range. Specifically, the vehicle controller(s) 122 may be communicatively coupled to the engine 22 and/or the transmission 24 of the work vehicle 12 via a wired or wireless connection to allow control signals 138 to be transmitted from the vehicle controller(s) 122 to the engine 22 and/or the transmission 24. The control signals 138 may be configured to instruct the engine 22 to vary its power output to increase or decrease the speed of the work vehicle 12. For example, when the monitored operational parameter falls outside of the predetermined range, the control signals 138 may instruct the engine 22 to decrease its power output (e.g., by decreasing the fuel flow to the engine 22) such that the speed at which the work vehicle 12 is moved across the field is decreased. Furthermore, the control signals 138 may be configured to instruct the transmission 24 to upshift or downshift to change the speed of the work vehicle 12. For example, when the monitored operational parameter falls outside of the predetermined range, the control signals 138 may instruct the transmission 24 to downshift such that the speed at which the work vehicle 12 is moved across the field is decreased. Such a reduction in vehicle speed may reduce or prevent the implement 10 from oscillating relative to the vehicle 12. However, it should be appreciated that, in alternative embodiments, the vehicle controller(s) 122 may be configured to transmit control signals 138 to any other suitable component of the work vehicle 12 and/or implement 10 such that the speed of the work vehicle 12 and/or implement 10 is adjusted.

In several embodiments, the implement controller(s) 116 may be configured to control the operation of the valve(s) 130 based on data received from the vehicle controller(s) 122. As indicated above, in one embodiment, the vehicle controller(s) 122 may be configured to receive location signals 136 from the location sensor 104 mounted on the vehicle 12. In such embodiment, the vehicle controller(s) 122 may, in turn, be configured to transmit data (e.g., as indicated by dashed line 142 in FIG. 4), such as data indicative of the location of the vehicle 12 within the field, to the implement controller(s) 116. Such data 142 may be raw data (e.g., raw GPS coordinates) or processed/preprocessed data (e.g., a cross-track error of the vehicle 12). As such, in embodiments in which the implement sensor(s) 114 correspond to location sensor(s) configured to detect the location of the implement 10 within the field, the implement controller(s) 116 may be configured to determine a parameter associated with the relative positioning between the implement 10 and the vehicle 12. For example, in one embodiment, such parameter may be a differential in the headings of the implement 10 and the vehicle 12. In another embodiment, such parameter may be a differential in the positioning of the implement 10 in the vehicle 12 relative to the crop rows or other features within the field. In a further embodiment, such parameter may be a differential in the cross-track errors of the implement 10 and the vehicle 12. Thereafter, in the event that the determined relative positioning parameter varies from a predetermined relative positioning (e.g., the heading differential falls outside of a predetermined range), the implement controller(s) 116 may be configured to request that the vehicle controller(s) 122 control the operation of the valve(s) 130 on the work vehicle 12 in a manner that returns the relative positioning of the implement 10 and the vehicle 12 to the predetermined relative positioning. However, it should be appreciated that, in alternative embodiments, the implement controller(s) 116 may be configured to initiate control of the valve(s) 130 based on any other suitable data and/or parameter received from the vehicle controller(s) 122.

In some embodiments, in addition to the implement 10, the work vehicle 12 may be configured to tow a second implement (not shown) across the field. In such embodiments, the second implement may correspond to an air cart or other bulk storage vehicle configured to carry seed, fertilizer, liquid nitrogen, anhydrous ammonia, and/or any other suitable agricultural substance that may be dispensed onto the field by the implement 10. Such second implement may be coupled to the work vehicle 12, with the implement 10 being coupled to the second implement. Alternatively, the implement 10 may be coupled to the work vehicle 12, with the second implement being coupled to the implement 10. In embodiments in which the second implement includes steerable wheels or tracks, the system 100 may be configured to control the direction of travel of the second implement in the same or a substantially similar manner as the system 100 controls the direction of travel of the implement 10 as described above.

Figure 5:
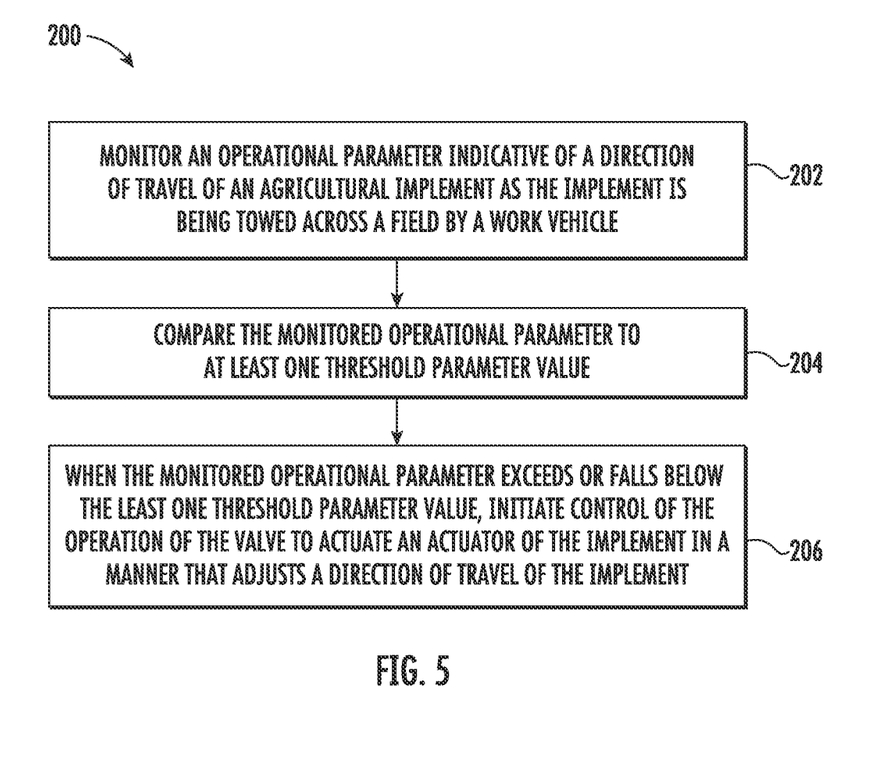
FIG. 5 illustrates a flow diagram of one embodiment of a method for controlling the direction of travel of an agricultural implement in accordance with aspects of the present subject matter.

Referring now to FIG. 5, a flow diagram of one embodiment of a method 200 for controlling the direction of travel of an agricultural implement being towed by a work vehicle is illustrated in accordance with aspects of the present subject matter. In general, the method 200 will be described herein with reference to the implement 10, the work vehicle 12, the track assembly and the system 100 described above with reference to FIGS. 1-4. However, it should be appreciated by those of ordinary skill in the art that the disclosed method 200 may generally be utilized to control the operation of an agricultural implement being towed by a work vehicle for any agricultural implement having any suitable implement configuration, work vehicles having any other suitable vehicle configuration, hitch assemblies having any other suitable assembly configuration, and/or systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with an implement-based computing device installed on the implement, an operational parameter indicative of a direction of travel of an agricultural implement as the implement is being towed across a field by a work vehicle. For instance, as described above, one or more implement controllers 116 may be communicatively coupled to one or more sensors 114 configured to monitor a given operational parameter(s) of the implement 10 that is indicative of its direction of travel 14, such as the location of the implement 10 within the field or the orientation of the implement 10 relative to the vehicle 12 or a feature(s) within the field. As such, sensor data 128 transmitted from the sensor(s) 114 may be received by the implement controller(s) 116 for monitoring the associated operational parameter(s).

Additionally, at (204), the method 200 may include comparing, with the implement-based computing device, the monitored operational parameter to at least one threshold parameter value. For instance, as described above, the implement controller(s) 116 may be configured to compare the monitored operational parameter(s) to at least one threshold parameter value, such as a maximum parameter threshold and/or a minimum parameter threshold. Assuming the monitored operational parameter(s) has exceeded the maximum operational parameter threshold or fallen below the minimum operational parameter threshold, the implement controller(s) 116 may determine that the direction of travel 14 of the implement 10 should be adjusted.

Moreover, as shown in FIG. 5, at (206), the method 200 may include, when the monitored operational parameter exceeds or falls below the least one threshold parameter value, initiating, with the implement-based computing device, control of the operation of the valve to actuate an actuator of the implement in a manner that adjusts a direction of travel of the implement. For instance, as described above, the implement controller(s) 116 may be configured to transmit request signals 132 to the vehicle controller(s) 122 requesting the vehicle controller(s) 122 to control the operation of the valve(s) 130 to adjust the direction of travel 14 of the implement 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling a direction of travel of an agricultural implement, the system comprising:
   a sensor configured to detect an operational parameter indicative of the direction of travel of the agricultural implement;
   an actuator configured to be installed on the agricultural implement so as to allow the actuator to adjust the direction of travel of the agricultural implement, the actuator configured to be fluidly coupled to a valve configured to control an operation of the actuator; and
   an implement-based controller configured to be supported on the agricultural implement and communicatively coupled to the sensor, wherein the implement-based controller transmits signals to a secondary controller separate from the agricultural implement requesting that the secondary controller control an operation of the valve based on data received from the sensor to adjust the direction of travel of the agricultural implement.

2. The system of claim 1, wherein the implement-based controller:
   monitors the detected operational parameter relative to a predetermined parameter range; and
   transmits the signals to the secondary controller requesting that the secondary controller control the operation of the valve when the detected operational parameter exceeds a predetermined maximum parameter value of the predetermined parameter range or falls below a predetermined minimum parameter value of the predetermined parameter range.

3. The system of claim 1, wherein the operational parameter is indicative of an orientation of the agricultural implement relative to one or more features within a field across which the agricultural implement is being towed.

4. The system of claim 1, wherein the sensor comprises a location sensor configured to detect a location of the agricultural implement within a field across which the agricultural implement is towed.

5. The system of claim 1, wherein the operational parameter is indicative of an orientation of the agricultural implement relative to a work vehicle configured to tow the agricultural implement.

6. The system of claim 5, wherein the implement-based controller receives data indicative of a location of the work vehicle from a vehicle-based sensor and determines the orientation of the agricultural implement relative to the work vehicle based on the received data indicative of the location of the work vehicle and the received data indicative of the operational parameter.

7. The system of claim 1, wherein the implement-based controller transmits signals to the secondary controller further requesting that the secondary controller adjust a speed at which the agricultural implement is being moved across a field.

8. The system of claim 1, further comprising:
   a track assembly configured to be installed on the agricultural implement,
   wherein the actuator is configured to adjust an orientation of the track assembly to adjust the direction of travel of the agricultural implement.

9. The system of claim 1, wherein the secondary controller comprises a vehicle-based controller installed on a work vehicle configured to tow the agricultural implement, and the valve is provided in operative association with the work vehicle.

10. An agricultural implement, comprising:
    a frame;
    a sensor supported by the frame and being configured to detect an operational parameter indicative of a direction of travel of the agricultural implement;
    an actuator supported by the frame and being configured to adjust the direction of travel of the agricultural implement, the actuator configured to be fluidly coupled to a valve configured to control an operation of the actuator; and
    an implement-based controller supported by the frame and communicatively coupled to the sensor, wherein the implement-based controller transmits signals to a secondary controller separate from the agricultural implement requesting that the secondary controller adjust an operation of the valve based on the data received from the sensor to adjust the direction of travel of the agricultural implement.

11. The agricultural implement of claim 10, wherein the implement-based controller:
    monitors the detected operational parameter relative to a predetermined parameter range; and
    transmits the signals to the secondary controller requesting that the secondary controller control the operation of the valve when the detected operational parameter exceeds a predetermined maximum parameter value of the predetermined parameter range or falls below a predetermined minimum parameter value of the predetermined parameter range.

12. The agricultural implement of claim 10, wherein the operational parameter is indicative of an orientation of the agricultural implement relative to one or more features within a field across which the agricultural implement is being towed.

13. The agricultural implement of claim 10, wherein the sensor comprises a location sensor configured to detect a location of the agricultural implement within a field across which the agricultural implement is towed.

14. The agricultural implement of claim 10, wherein the operational parameter is indicative of an orientation of the agricultural implement relative to a work vehicle configured to tow the agricultural implement.

15. The agricultural implement of claim 14, wherein the implement-based controller receives data indicative of a location of the work vehicle from a vehicle-based sensor and determines the orientation of the agricultural implement relative to the work vehicle based on the received data indicative of the location of the work vehicle and the received data indicative of the operational parameter.

16. The agricultural implement of claim 10, wherein the implement-based controller transmits signals to the secondary controller further requesting that the secondary controller adjust a speed at which the agricultural implement is being moved across a field.

17. The agricultural implement of claim 10, further comprising:
a track assembly coupled to the frame,
wherein the actuator is configured to adjust an orientation of the track assembly relative to the frame to adjust the direction of travel of the agricultural implement.

18. The agricultural implement of claim 10, wherein the actuator corresponds to a first actuator, the agricultural implement further comprising:
a second actuator configured to adjust the position of one or more components of the agricultural implement, the second actuator configured to be fluidly coupled to the valve; and
a splitter device fluidly coupled to the first valve, the first actuator, and the second actuator, the splitter device being configured to selectively divert a flow of fluid to one of the first actuator or the second actuator.

19. The agricultural implement of claim 10, wherein the secondary controller comprises a vehicle-based controller installed on a work vehicle configured to tow the agricultural implement, and the valve is provided in operative association with the work vehicle.

20. A method for controlling a direction of travel of an agricultural implement, the agricultural implement including an actuator, the actuator being fluidly coupled to a valve configured to control an operation of the actuator to adjust the direction of travel of the agricultural implement, the method comprising:
monitoring, with an implement-based computing device installed on the agricultural implement, an operational parameter indicative of the direction of travel of the agricultural implement based on data received from a sensor installed on the agricultural implement;
comparing, with the implement-based computing device, the monitored operational parameter to at least one threshold parameter value; and
transmitting, with the implement-based computing device, signals to a secondary computing device separate from the agricultural implement requesting that the secondary computing device adjust an operation of the valve to adjust the direction of travel of the agricultural implement when the monitored operational parameter exceeds or falls below the least one threshold parameter value.

* * * * *